(12) United States Patent
Satya Sivajee Pinnamaneni et al.

(10) Patent No.: US 12,626,243 B2
(45) Date of Patent: May 12, 2026

(54) METHOD AND SYSTEM FOR MASTERCARD AUTHENTICATING NON-FUNGIBLE TOKENS

(71) Applicant: Mastercard International Incorporated, Purchase, NY (US)

(72) Inventors: Venkata Satya Sivajee Pinnamaneni, Dardenne Prairie, CO (US); Kaushal Shetty, Thane (IN); Sachin Kumar Singh, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 159 days.

(21) Appl. No.: 18/126,697

(22) Filed: Mar. 27, 2023

(65) Prior Publication Data

US 2024/0330901 A1 Oct. 3, 2024

(51) Int. Cl.
G06Q 20/36 (2012.01)
G06Q 20/38 (2012.01)
G06Q 20/40 (2012.01)

(52) U.S. Cl.
CPC ....... G06Q 20/367 (2013.01); G06Q 20/3829 (2013.01); G06Q 20/401 (2013.01); *G06Q 2220/00* (2013.01)

(58) Field of Classification Search
None
See application file for complete search history.

(56) References Cited

U.S. PATENT DOCUMENTS 10,614,661 B2 4/2020 Simons
11,334,875 B2 5/2022 Yantis et al.
(Continued)

FOREIGN PATENT DOCUMENTS

WO 2022178096 A1 8/2022

OTHER PUBLICATIONS

Notification of Transmittal of the International Search Report and the Written Opinion of the International Searching Authority, or the Declaration, issued Jul. 4, 2024, in corresponding International Application No. PCT/US2024/017211, 10 pages.
(Continued)

*Primary Examiner* — Chrystina E Zelaskiewicz
(74) *Attorney, Agent, or Firm* — Panitch Schwarze Belisario & Nadel LLP

(57) ABSTRACT
A method for authentication of non-fungible tokens (NFTs) includes receiving a validation request for an NFT from an external platform including a smart contract identifier; calculating an authentication score for the NFT based on at least (i) wallet activity associated with a creator blockchain wallet identified based on the smart contract identifier, and (ii) a fraud score of the external platform; and if the calculated authentication score for the NFT is below a predetermined threshold value, transmitting a negative response message to the validation request indicating unsuccessful validation of the NFT, or if the calculated authentication score for the NFT is above the predetermined threshold value, transmitting a positive response message to the validation request indicating successful validation of the NFT and instructing the external platform to execute a smart contract associated with the smart contract identifier.

16 Claims, 5 Drawing Sheets

(56) References Cited

U.S. PATENT DOCUMENTS

| 11,430,066 | B2 | 8/2022 | Doney | |
| 11,615,399 | B1 * | 3/2023 | Smith | G06Q 20/38215 |
| | | | | 705/65 |
| 2020/0020037 | A1 * | 1/2020 | Idrobo | G06Q 40/08 |
| 2020/0286084 | A1 * | 9/2020 | Kwatra | H04L 9/50 |
| 2021/0248338 | A1 | 8/2021 | Spivack et al. | |
| 2022/0229883 | A1 | 7/2022 | Khandelwal et al. | |
| 2022/0239495 | A1 | 7/2022 | Norton et al. | |
| 2022/0271936 | A1 | 8/2022 | Doney | |
| 2022/0292490 | A1 | 9/2022 | Collen | |
| 2022/0374503 | A1 | 11/2022 | Goldston et al. | |
| 2022/0407702 | A1 * | 12/2022 | Jakobsson | H04L 9/50 |
| 2023/0325814 | A1 * | 10/2023 | Vijayan | G06Q 20/3829 |
| | | | | 705/66 |
| 2024/0420138 | A1 * | 12/2024 | Andon | G06Q 30/0277 |
| 2024/0428306 | A1 * | 12/2024 | Sliwka | H04L 9/0891 |

OTHER PUBLICATIONS

Bhujel Sangam et al, "A Survey: Security, Transparency, and Scalability Issues of NFT's and Its Marketplaces," Sensors, Nov. 15, 2022, 29 pages.
Das et al, "Understanding Security Issues in th NFT Ecosystem", CCS '22, Nov. 7-11, 2022, pp. 1-17.

* cited by examiner

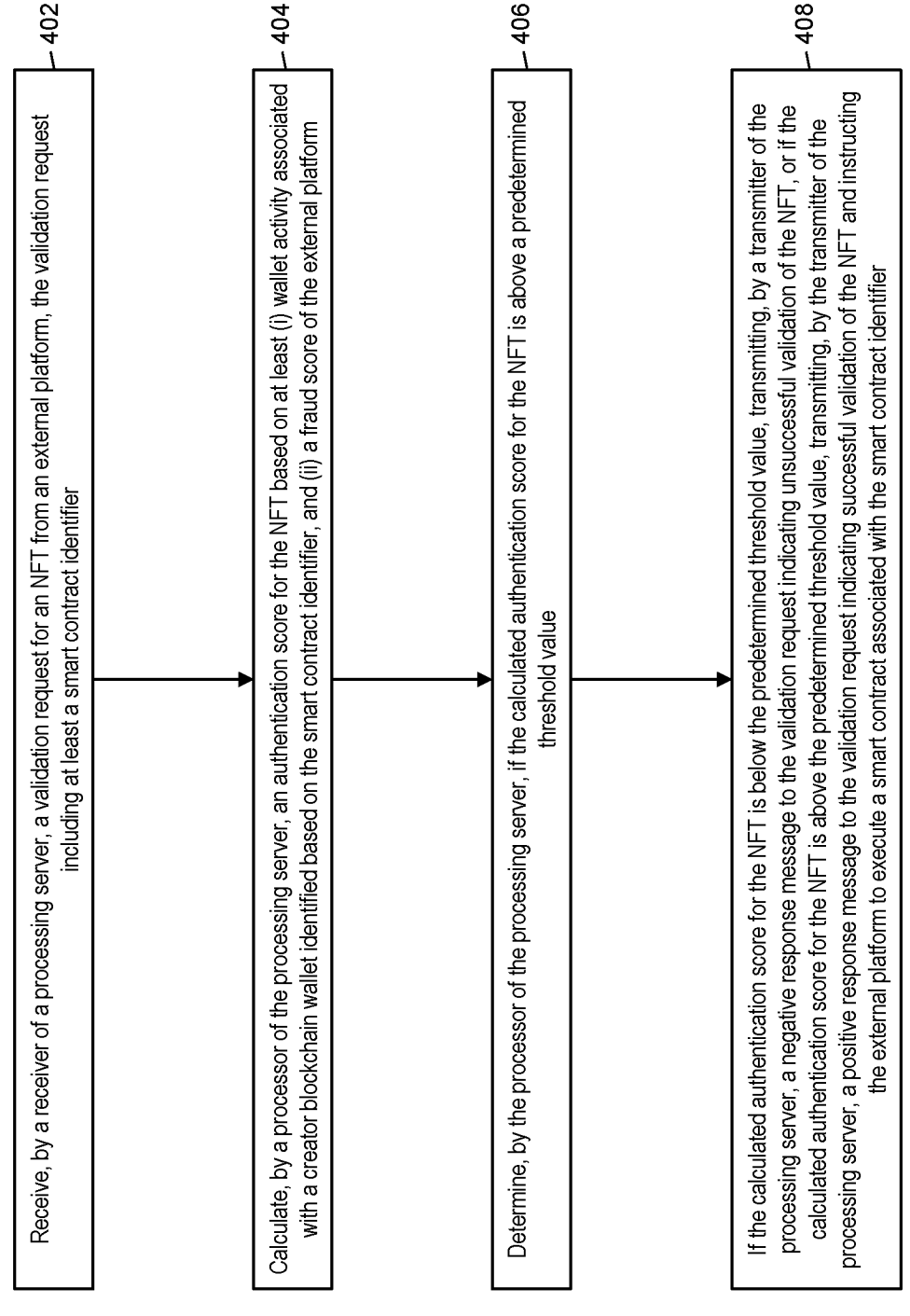

400

Receive, by a receiver of a processing server, a validation request for an NFT from an external platform, the validation request including at least a smart contract identifier — 402

Calculate, by a processor of the processing server, an authentication score for the NFT based on at least (i) wallet activity associated with a creator blockchain wallet identified based on the smart contract identifier, and (ii) a fraud score of the external platform — 404

Determine, by the processor of the processing server, if the calculated authentication score for the NFT is above a predetermined threshold value — 406

If the calculated authentication score for the NFT is below the predetermined threshold value, transmitting, by a transmitter of the processing server, a negative response message to the validation request indicating unsuccessful validation of the NFT, or if the calculated authentication score for the NFT is above the predetermined threshold value, transmitting, by the transmitter of the processing server, a positive response message to the validation request indicating successful validation of the NFT and instructing the external platform to execute a smart contract associated with the smart contract identifier — 408

FIG. 4

METHOD AND SYSTEM FOR MASTERCARD AUTHENTICATING NON-FUNGIBLE TOKENS

FIELD

The present disclosure relates to the authentication of non-fungible tokens (NFTs), specifically the use of historical wallet and exchange data to calculate authentication scores for measuring the validity of an NFT.

BACKGROUND

Blockchains were first created as a way of providing for a cryptographic currency that could be transferred among participants in a decentralized manner that provided the participants with anonymity. Over time, people and entities discovered new uses for blockchains in a variety of different industries and applications. A recent new application for blockchains is in conjunction with non-fungible tokens, most commonly referred to as "NFTs." An NFT is a unique digital object whose provenance is tracked on a blockchain that can be bought and sold. At its inception, NFTs were most often digital artwork, but they have since expanded to also include other digital objects, such as representing items in online video games, songs, sports video clips, etc. An NFT, once created, is stored in a blockchain with transfers of ownership recorded therein.

Much of the value of an NFT comes from its uniqueness; the purchaser can claim ownership of the NFT and show it off to others the same way an art collector can. Still, like with traditional, physical paintings, there is little to stop someone from creating a copy of the digital object. In most cases, the copy is marketed as such and has a significantly lower value than the original. However, nefarious actors can make a copy of an existing NFT and present is as the original (e.g., representing that they have the real Mona Lisa), can make an NFT and claim to be a famous artist (e.g., Banksy), or can make an NFT that they claim comes from a famous artist (e.g., representing a painting having been done by Picasso). Currently, there are no systems designed for authenticating an NFT or the seller thereof. While a more tech savvy purchaser can identify the history of an NFT on a blockchain, they can still be unable to determine if the NFT itself or the seller is genuine.

Thus, there is a need for a technical system that can authenticate an NFT prior to purchase.

SUMMARY

The present disclosure provides a description of systems and methods for authentication of non-fungible tokens (NFTs). When a purchaser wants to buy an NFT through a digital marketplace, the digital marketplace provides information on the purchase to a smart contract platform that has a smart contract for the NFT. The smart contract platform provides a validation request to a processing server for the purchase. The processing server calculates an authentication score for the NFT using available data including wallet activity of the creator of the NFT and history of the smart contract platform being used. The processing server then determines if the calculated score is above a threshold value. If the score is below a threshold value, then a response message is sent back to the platform indicating unsuccessful validation of the NFT, where the platform can refuse the transaction or notify the purchaser of the unsuccessful validation. If the score is above the threshold value, then a response message can be sent to the platform indicating successful validation, where the platform can execute the smart contract for the NFT to process the ownership transfer to the purchaser. In some cases, a visual marking can be applied to the NFT indicating the successful authentication to provided added assurance to future purchasers.

A method for authentication of non-fungible tokens (NFTs) includes receiving, by a receiver of a processing server, a validation request for an NFT from an external platform, the validation request including at least a smart contract identifier; calculating, by a processor of the processing server, an authentication score for the NFT based on at least (i) wallet activity associated with a creator blockchain wallet identified based on the smart contract identifier, and (ii) a fraud score of the external platform; determining, by the processor of the processing server, if the calculated authentication score for the NFT is above a predetermined threshold value; and if the calculated authentication score for the NFT is below the predetermined threshold value, transmitting, by a transmitter of the processing server, a negative response message to the validation request indicating unsuccessful validation of the NFT, or if the calculated authentication score for the NFT is above the predetermined threshold value, transmitting, by the transmitter of the processing server, a positive response message to the validation request indicating successful validation of the NFT and instructing the external platform to execute a smart contract associated with the smart contract identifier.

A system for authentication of non-fungible tokens (NFTs) includes: an external platform; and a processing server, the processing server including a receiver of a processing server receiving a validation request for an NFT from the external platform, the validation request including at least a smart contract identifier, a processor calculating an authentication score for the NFT based on at least (i) wallet activity associated with a creator blockchain wallet identified based on the smart contract identifier, and (ii) a fraud score of the external platform, and determining if the calculated authentication score for the NFT is above a predetermined threshold value, and a transmitter, wherein if the calculated authentication score for the NFT is below the predetermined threshold value, the transmitter of the processing server transmits a negative response message to the validation request indicating unsuccessful validation of the NFT, and if the calculated authentication score for the NFT is above the predetermined threshold value the transmitter of the processing server transmits a positive response message to the validation request indicating successful validation of the NFT and instructing the external platform to execute a smart contract associated with the smart contract identifier.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 4 is a flow chart illustrating an exemplary method for authentication of NFTs in accordance with exemplary embodiments.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

System for Authentication of Non-Fungible Tokens (NFTs)

Figure 1:
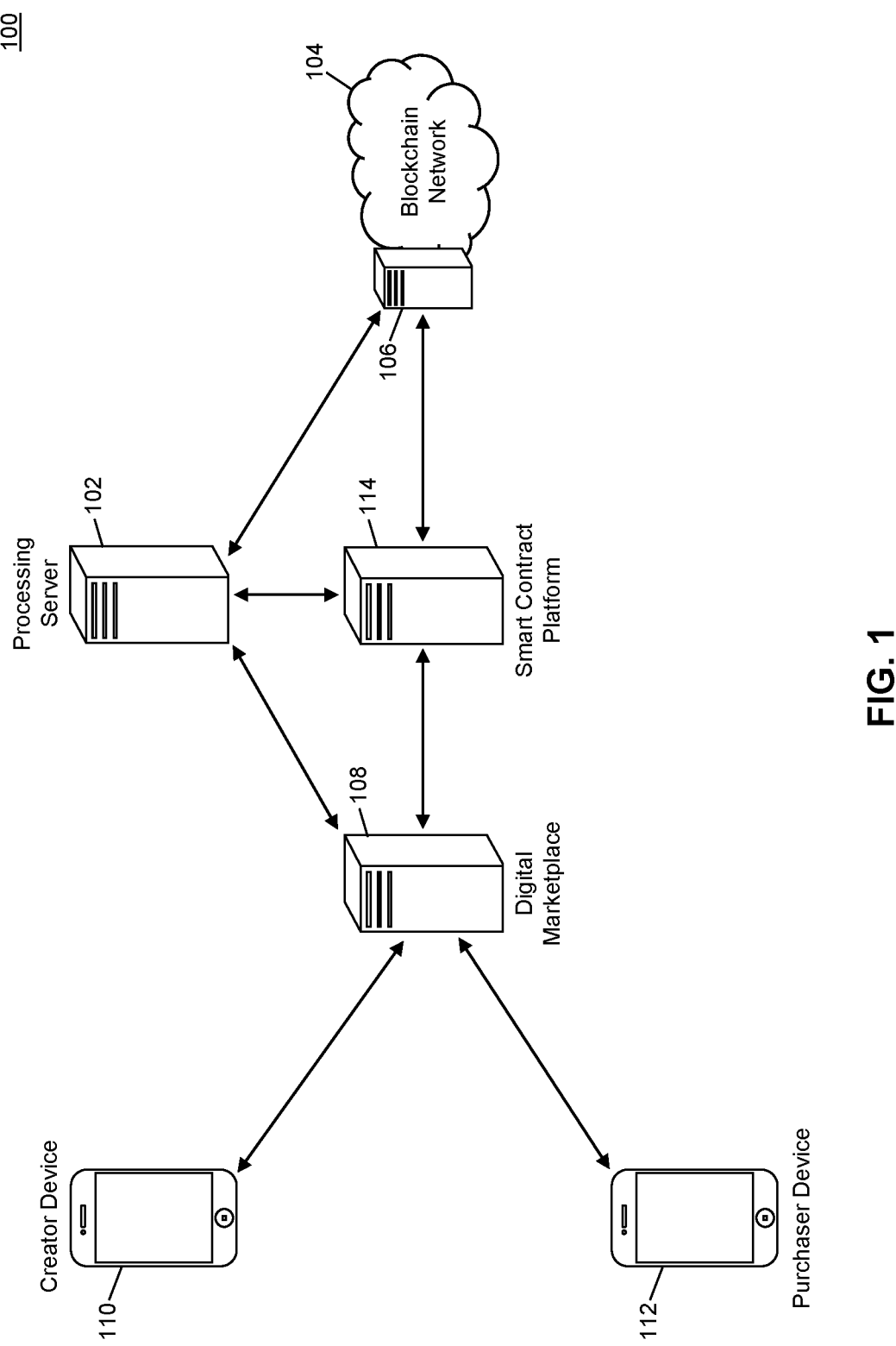
FIG. 1 is a block diagram illustrating a high-level system architecture for authenticating non-fungible tokens (NFTs) in accordance with exemplary embodiments.

FIG. 1 illustrates a system 100 for the authentication of NFTs.

The system 100 can include a processing server 102. The processing server 102, discussed in more detail below, can be configured to authenticate NFTs, such as during part of a purchase or ownership transfer process. The system 100 can also include a creator device 110 and purchaser device 112, where each device can have a blockchain wallet stored therein or otherwise associated therewith, as discussed in more detail below. The creator device 110 and purchaser device 112 can be any type of computing device suitable for performing the functions discussed herein, such as a desktop computer, laptop computer, notebook computer, tablet computer, cellular phone, smart phone, smart watch, smart television, wearable computing device, implantable computing device, etc.

Figure 5:
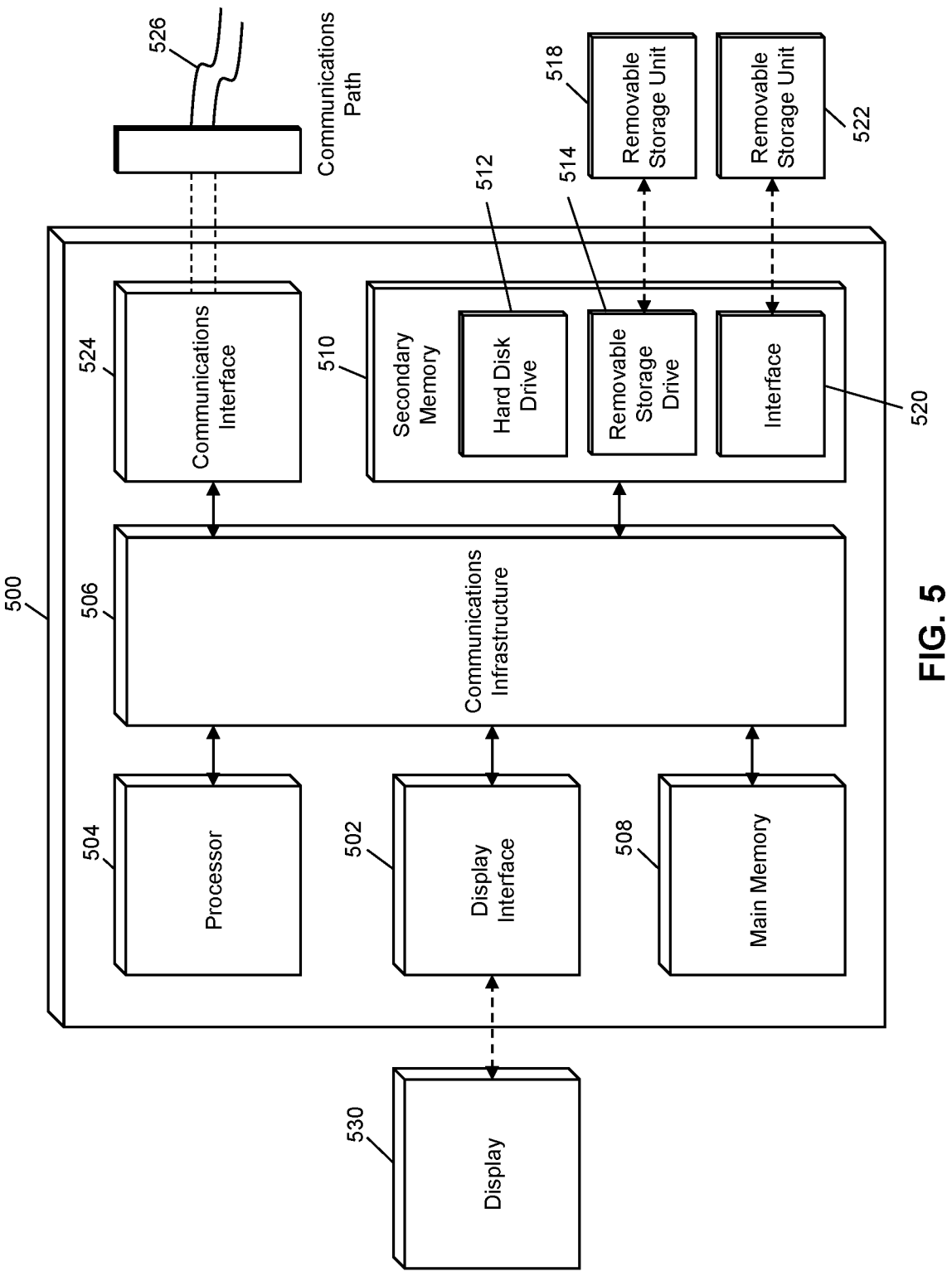
FIG. 5 is a block diagram illustrating a computer system architecture in accordance with exemplary embodiments.

The system 100 can also include a blockchain network 104. The blockchain network 104 can be comprised of a plurality of blockchain nodes 106. Each blockchain node 106 can be a computing system, such as illustrated in FIG. 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain can be a distributed ledger that is comprised of at least a plurality of blocks. Each block can include at least a block header and one or more data values. Each block header can include at least a timestamp, a block reference value, and a data reference value. The timestamp can be a time at which the block header was generated and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 106 in the blockchain network 104 prior to the generation and addition of a new block to the blockchain in order for the change to be made permanent. Computational and communication limitations can make such a modification exceedingly difficult, if not impossible, thus rendering the blockchain immutable.

In some embodiments, the blockchain can be used to store information regarding blockchain transactions conducted between two different blockchain wallets. A blockchain wallet can include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" can refer specifically to the private key. In other cases, the term "blockchain wallet" can refer to a computing device (e.g., creator device 110, purchaser device 112, etc.) that stores the private key for use thereof in blockchain transactions. For instance, each computing device can each have their own private key for respective cryptographic key pairs and can each be a blockchain wallet for use in transactions with the blockchain associated with the blockchain network. Computing devices can be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain can correspond to a blockchain transaction or other storage of data, as applicable. A blockchain transaction can consist of at least: a digital signature of the sender of currency (e.g., a purchaser device 112) that is generated using the sender's private key, a blockchain address of the recipient of currency (e.g., a creator device 110) generated using the recipient's public key, and a blockchain currency amount that is transferred or other data being stored. In some blockchain transactions, the transaction can also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction can also include the sender's public key, for use by an entity in validating the transaction. For the traditional processing of a blockchain transaction, such data can be provided to a blockchain node 106 in the blockchain network 104, either by the sender or the recipient. The node can verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block can be validated by other blockchain nodes 106 in the blockchain network 104 before being added to the blockchain and distributed to all of the blockchain nodes 106 in the blockchain network 104, respectively, in traditional blockchain implementations. In cases where a blockchain data value cannot be related to a blockchain transaction, but instead the storage of other types of data, blockchain data values can still include or otherwise involve the validation of a digital signature.

In the system 100, blockchains can also be used to store smart contracts. A smart contract can be a self-executing program stored on the blockchain that accepts input, performs one or more functions utilizing the input, and outputs one or more values as a result of the executed functions. In some cases, the system 100 can include multiple blockchains. For instance, the blockchain network 104 can have a first blockchain used to store cryptographic currency exchanged in the purchase of an NFT, while a smart contract platform 114 can have a second blockchain used to store smart contracts for initiating ownership transfers of NFTs, while a digital marketplace 108 can include a third smart contract used to store the NFTs and ownership information thereof. The system 100 can be implemented using any suitable number of blockchains that are used to store any combination of data used for the performing of the functions as discussed herein.

In the system 100, the creator device 110 (e.g., or a user of the creator device 110, collectively referred to herein as the creator device 110) can create a new NFT. The NFT can be any digital object that can be stored on a blockchain directly or via a reference identifier associated with the digital object (e.g., a hash value generated using the digital object). The creator device 110 can submit the NFT to a digital marketplace 108 to make available for sale. The digital marketplace 108 can be a computing system configured to perform the functions discussed herein, which can include the receipt, storage, and posting of NFTs for sale and the tracking of ownership transfers thereof. In some cases, the digital marketplace 108 can be a blockchain node 106 in a blockchain network 104 that stores data related to NFTs. In other cases, the digital marketplace 108 can be in communication with one or more blockchain nodes 106 in a blockchain network 104 that operates a blockchain for the storage of NFT data.

The digital marketplace 108 can receive the NFT along with information associated with the creator device 110. The information can include a public key of the blockchain wallet of the creator device 110 or other identifying information. In some cases, the NFT can be digitally signed by the creator device 110 using the private key of its blockchain wallet. The digital marketplace 108 can (e.g., directly or via a blockchain node 106) store the NFT and creator information in a blockchain. The digital marketplace 108 can then post the NFT as available for purchase. The digital marketplace 108 can use any suitable type of interface for displaying NFTs available for purchase, such as via a web page, application program, application programming interface, etc. In some cases, the creator device 110 can specify a cost for the NFT, such as a specific type of currency and associated amount. In other cases, the NFT can be posted by the digital marketplace 108 for sale in an auction where potential buyers can bid to purchase the NFT.

As part of the creation and storage of the NFT on a blockchain, a smart contract can be created for the NFT that is stored on a blockchain. The smart contract can be generated by a smart contract platform 114. The smart contract platform 114 can be a computing platform configured to generate and execute smart contracts for the transfer of ownership of NFTs, such as those operated by Ethereum, Polkadot, Solana, Corda, Stellar, Rootstock, etc. The smart contract can be configured that, once executed, transfers ownership of the NFT to a specified blockchain wallet on the appropriate blockchain.

Once the smart contract has been created and published to the appropriate blockchain and the NFT is available for purchase on the digital marketplace 108, the purchaser device 112 (e.g., or user thereof, collectively referred to herein as the purchaser device 112) can use a suitable interface to view the NFT on the digital marketplace 108. If the purchaser is interested in the purchase of the NFT, the purchaser device 112 can submit a purchase request to the digital marketplace 108 that includes a blockchain address for receipt of the NFT (e.g., generated via a public key of the blockchain wallet for the appropriate blockchain) as well as payment details. The payment details can vary depending on the payment method used for purchase of the NFT. For instance, if the NFT is being purchased with a cryptographic currency, the payment details can include one or more unspent transaction outputs and a digital signature generated using the private key of the purchaser device's blockchain wallet for the blockchain on which the cryptographic currency is held. In another example, if the NFT is being purchased with fiat currency, the payment details can include credit card information, a payment account number and routing number, etc.

The digital marketplace 108 can receive the purchase request from the purchaser device 112 for the NFT that identifies the NFT and includes the blockchain address and payment details. The digital marketplace 108 can perform any necessary verifications (e.g., checking the balance of unspent transaction outputs, validating payment card information, etc.) and then electronically transmit the purchase request data to the smart contract platform 114 that has the smart contract for the NFT. In cases where more than one smart contract platform 114 has a smart contract for the NFT, the smart contract platform 114 to be used can be specified by the creator device 110 when submitting the NFT or the purchaser device 112 when submitting the purchase request.

The smart contract platform 114 can receive the purchase request and then can request validation to be performed by the processing server 102. In some cases, the smart contract platform 114 can request validation for all NFT purchases. In other cases, the smart contract platform 114 can request validation for those NFTs that have not been previously validated. In some instances, the purchaser device 112 can request validation when submitting the purchase request. In some embodiments, a purchaser device 112 can request validation for a specific NFT before submitting any payment request, such as in a separate validation request submitted to the digital marketplace 108 and forwarded to the smart contract platform 114.

The validation request can be submitted to the processing server 102 by the smart contract platform 114 using any suitable communication network and method. The validation request can include any data used by the processing server 102 in identifying the NFT and any other data used in performing the validation. For example, the validation request can include the smart contract, or a reference identifier associated therewith, where the processing server 102 can identify the smart contract and, from the smart contract, identify the NFT and the creator device 110. In another example, the validation request can include the NFT, or reference identifier associated therewith. In some cases, the validation request can also include the public key or other data of the blockchain wallet of the purchaser device 112 on the blockchain on which the NFT ownership is recorded. The processing server 102 can receive the validation request and then identify any additional information used in the validation via the data included in the validation request.

The processing server 102 can calculate an authentication score for the NFT. The authentication score can be based on one or more of: (i) wallet activity of the creator device 110, (ii) wallet activity of the purchaser device 112, (iii) ownership history of the NFT, (iv) activity on the digital marketplace 108, (v) activity on the smart contract platform 114, (vi) fraud score of the smart contract platform 114, (vii) ranking of the smart contract platform 114 among all smart contract platforms, or any other suitable metric. Wallet activity of the creator device 110 and/or purchaser device 112 can affect the authentication score such as by reducing (e.g., indicating stronger likelihood of fraud) the authentication score if there is a low level of activity or have been past instances of the creation or ownership transfer of fraudulent NFTs. Ownership history of the NFT can similarly negatively affect the authentication score if the NFT has been owned by blockchain wallets associated with fraudulent NFTs or fraudulent transfers. In some cases, the processing server 102 can maintain fraud scores for smart contract platforms 114 based on their participation in the transfer of fraudulent NFTs and/or rank smart contract platforms 114 based on their participation in the transfer of fraudulent NFTs and/or their fraud scores. In those cases, an authentication score calculated for an NFT can be negatively affected by a higher fraud score (e.g., indicating higher likelihood of fraud) for the smart contract platform 114 or negative affected by a lower ranking for the smart contract platform 114 among available smart contract platforms.

Once the authentication score has been calculated, the processing server 102 can determine if the authentication score is above a threshold value for determining authenticity of an NFT. In some cases, the threshold value can be set by the processing server 102. In other cases, the purchaser device 112 can set the threshold value, such as can be included in the purchase request and/or validation request submitted by the purchaser device 112. If the authentication score is below the threshold value, then the processing server 112 can transmit a response message to the smart contract platform 114 that indicates that the authentication of the NFT was unsuccessful. The smart contract platform 114 can forward the response message to the digital marketplace 108, which can inform the purchaser device 112 of the unsuccessful authentication. The purchaser device 112 can decide whether or not to move forward with the purchase of the NFT following the unsuccessful authentication. In some cases, the purchase of the NFT can be automatically denied as a result of the unsuccessful authentication. In some instances, the automatic denial can be based on the authentication score, such as where the purchaser device 112 is provided with an opportunity to continue with the transaction if the authentication score is below the threshold value but above a second threshold, but where the transaction is automatically denied without the option to continue if the authentication score is below the second threshold.

If the authentication score for the NFT is above the threshold value, then the processing server 102 can transmit a response message to the smart contract platform 114 indicating the successful authentication of the NFT. The smart contract platform 114 can forward the response message to the digital marketplace 108, which can inform the purchaser device 112 of the successful authentication. In some cases, the purchase of the NFT will be automatically initiated as a result of the successful authentication, which can happen at the request of the purchaser device 112 when submitting the purchase request. In other cases, the purchaser device 112 can be notified of the successful authentication and prompted to approve initiation of the purchase of the NFT.

If the purchase is to proceed, the smart contract platform 114 can execute the smart contract for the NFT. Execution of the smart contract can result in the submission of a new blockchain transaction to a blockchain node 106 in the blockchain network 104 for the ownership of NFTs that transfers ownership of the NFT from the creator device 110 and/or digital marketplace 108 (e.g., or blockchain wallet thereof) to the purchaser device 112 (e.g., or blockchain wallet thereof). In some cases, the smart contract can be executed with the recipient address of the purchaser device 112 as input. In some instances, execution of the smart contract can also initiate a payment transaction for the payment for purchase of the NFT, where suitable information for the payment transaction is supplied as input to the smart contract In such instances, the smart contract can initiate the payment transaction first and await transfer of ownership of the NFT until the payment is successful. In other instances, the smart contract platform 114 and/or digital marketplace 108 can separately initiate the payment transaction for payment using the supplied payment information. In some such instances, the payment transaction can be initiated and successfully processed before the smart contract is executed.

In some embodiments, the processing server 102 can be configured to generate data indicating successful authentication of an NFT. For instance, the processing server 102 can digitally sign an authenticated NFT using a private key of a cryptographic key pair associated with the processing server 102. In another example, the processing server 102 can use a private key to generate a digital certificate that can be stored in the blockchain with the NFT or stored in an alternative blockchain. In some cases, a visual representation of the digital signature or digital certificate can be generated and appended to (e.g., overlayed onto) the NFT to indicate to anyone interested in the NFT that it has been successfully authenticated. For instance, a small logo, seal, certificate, etc. can be displayed on a corner of the digital object. In some cases, the visual representation can include a reference identifier to the digital signature or digital certificate stored on the blockchain for use by an interested party in verifying that the NFT was successfully authenticated as indicated. In some instances, the processing server 102 can make the public key of its cryptographic key pair publicly available so that any interested party can validate the digital signature or digital certificate to ensure its authenticity.

After a validation has been performed of an NFT, whether successful or unsuccessful, the processing server 102 can update its data for use in future authentication score calculates. For instance, the processing server 102 can update the activity history for the creator device 110 and purchaser devices 112, can update the history for the digital marketplace 108 and smart contract platform 114, can update a fraud score for the smart contract platform 114, and update its rankings of smart contract platforms. The updated data can be used in future authentication score calculations, such that, if the purchased NFT was successfully authenticated, future authentication scores for NFTs created by the creator device 110 can be higher. Likewise, future purchases of an already authenticated NFT can, in some cases, be considered authenticated prior to a validation request by virtue of the digital certificate, enabling a new purchaser to have higher trustworthiness that the available NFT is authentic.

The methods and systems discussed herein provide for authentications of NFTs. A third-party processing server 102 can calculate an authentication score for an NFT using a variety of metrics to provide a score indicative of the likelihood that an NFT available for purchase on a digital marketplace 108 is legitimate (e.g., unique, original, not a copy, from a trustworthy source, etc.). This can enable genuine creators to have a stronger market presence when they sell authenticated NFTs and enable purchasers to have more faith in the products they are purchasing. Specifically, by generating a visual representation of a digital signature or digital certificate and appending the visual representation to (over overlayed onto) an NFT provides an increased level of security regarding authenticity in the NFT and blockchain technologies.

Processing Server

Figure 2:
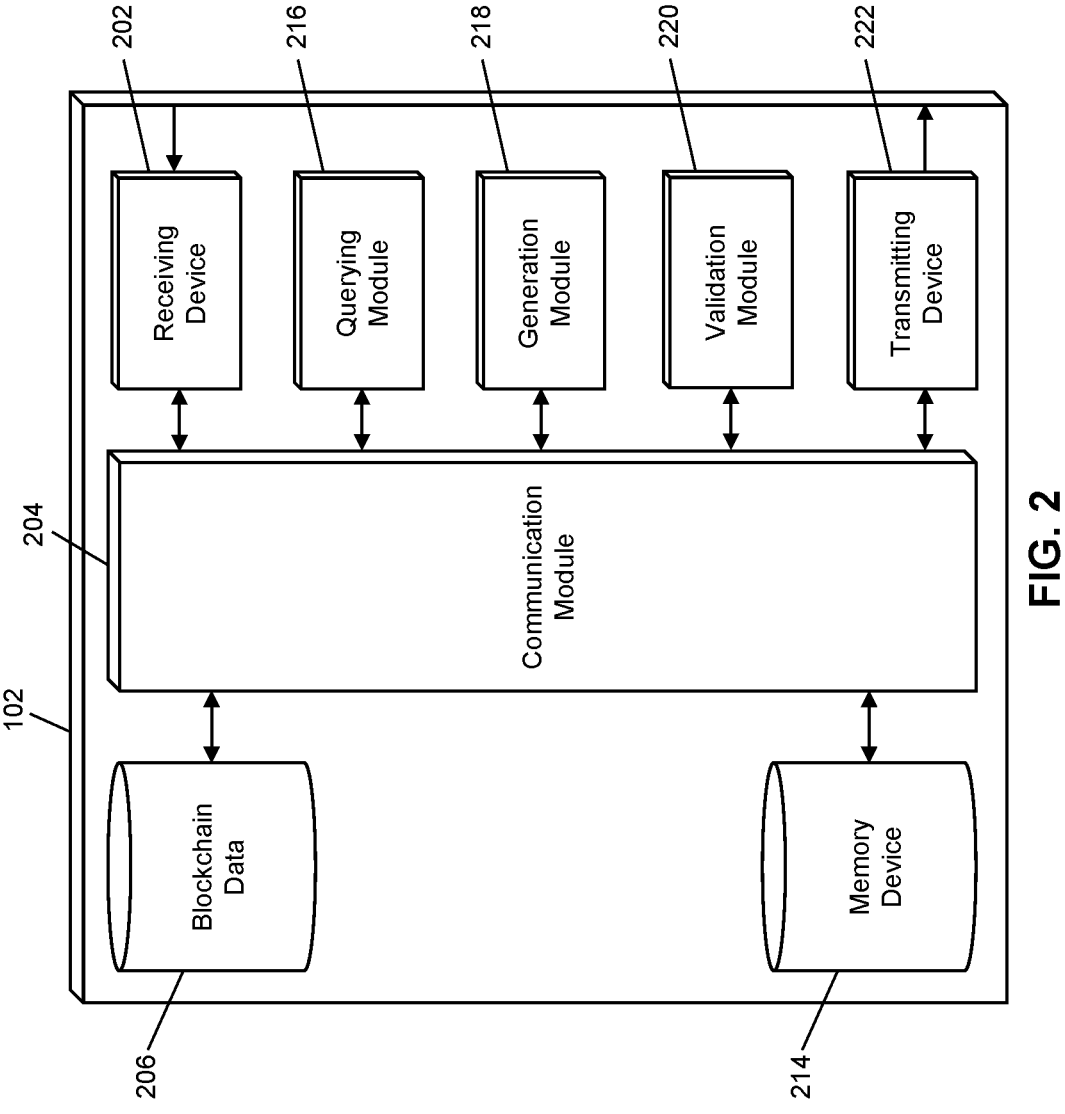
FIG. 2 is a block diagram illustrating the processing server in the system of FIG. 1 for authenticating NFTs in accordance with exemplary embodiments.

FIG. 2 illustrates an embodiment of a processing server 102. It will be apparent to persons having skill in the relevant art that the embodiment of the processing server 102 illustrated in FIG. 2 is provided as illustration only and cannot be exhaustive to all possible configurations of the processing server 102 suitable for performing the functions as discussed herein. For example, the computer system 500 illustrated in FIG. 5 and discussed in more detail below can be a suitable configuration of the processing server 102. In some cases, additional components of the system 100, such as the blockchain nodes 106, digital marketplace 108, creator device 110, purchaser device 112, and smart contract platform 114 can include the components illustrated in FIG. 2 and discussed below.

The processing server 102 can include a receiving device 202. The receiving device 202 can be configured to receive data over one or more networks via one or more network protocols. In some instances, the receiving device 202 can be configured to receive data from blockchain nodes 106, digital marketplace 108, creator device 110, purchaser device 112, smart contract platform 114, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by smart contract platforms 114 that can be superimposed or otherwise encoded with validation requests, which can include smart contract data, non-fungible token (NFT) data, wallet data, blockchain data, etc. The receiving device 202 can also be configured to receive data signals electronically transmitted by digital marketplaces 108 and blockchain nodes 106, which can be superimposed or otherwise encoded with wallet activity data, NFT data, blockchain data, transaction data, etc.

The processing server 102 can also include a communication module 204. The communication module 204 can be configured to transmit data between modules, engines, databases, memories, and other components of the processing server 102 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the processing server 102 and external components of the processing server 102, such as externally connected databases, display devices, input devices, etc. The processing server 102 can also include a processing device. The processing device can be configured to perform the functions of the processing server 102 discussed herein. In some embodiments, the processing device can include and/or be comprised of a plurality of engines and/or modules specially configured to perform one or more functions of the processing device, such as a querying module 216, generation module 218, validation module 220, etc. As used herein, the term "module" can be software or hardware particularly programmed to receive an input, perform one or more processes using the input, and provides an output. The input, output, and processes performed by various modules will be apparent to one skilled in the art based upon the present disclosure.

The processing server 102 can also include blockchain data 206, which can be stored in a memory device 214 of the processing server 102 or stored in a separate area within the computing system 200 or accessible thereby. The blockchain data 206 can include a blockchain, which may be comprised of a plurality of blocks and be associated with the blockchain networks 104 and a core blockchain. In some cases, the blockchain data 206 can further include any other data associated with the blockchain and management and performance thereof, such as block generation algorithms, digital signature generation and confirmation algorithms, communication data for blockchain nodes 106, smart contracts, cryptographic keys, etc. The blockchain data 206 can also include data used by the processing server 102 for actions associated with a blockchain, such as cryptographic key pairs for blockchain wallets, public keys for generating destination addresses or validating digital signatures, transaction histories, cryptocurrency amounts, etc.

The processing server 102 can also include a memory device 214. The memory device 214 can be configured to store data for use by the processing server 102 in performing the functions discussed herein, such as public and private keys, symmetric keys, etc. The memory device 214 can be configured to store data using suitable data formatting methods and schema and can be any suitable type of memory, such as read-only memory, random access memory, etc. The memory device 214 can include, for example, encryption keys and algorithms, communication protocols and standards, data formatting standards and protocols, program code for modules and application programs of the processing device, and other data that can be suitable for use by the processing server 102 in the performance of the functions disclosed herein. In some embodiments, the memory device 214 can be comprised of or can otherwise include a relational database that utilizes structured query language for the storage, identification, modifying, updating, accessing, etc. of structured data sets stored therein. The memory device 214 can be configured to store, for example, cryptographic keys, cryptographic key pairs, cryptographic algorithms, encryption algorithms, communication information, data formatting rules, network identifiers, smart contracts, wallet activity, ownership transfer activity, fraud scores, transaction histories, platform rankings, etc.

The processing server 102 can include a querying module 216. The querying module 216 can be configured to execute queries on databases to identify information. The querying module 216 can receive one or more data values or query strings and can execute a query string based thereon on an indicated database, to identify information stored therein. The querying module 216 can then output the identified information to an appropriate engine or module of the processing server 102 as necessary. The querying module 216 can, for example, execute a query on the memory device 214 to identify wallet activity for use in calculating an authentication score for an NFT.

The processing server 102 can also include a generation module 218. The generation module 218 can be configured to generate data for use by the processing server 102 in performing the functions discussed herein. The generation module 218 can receive instructions as input, can generate data based on the instructions, and can output the generated data to one or more modules of the processing server 102. For example, the generation module 218 can be configured to generate data messages, notification messages, response messages, cryptographic keys, blockchain transactions, blockchain data values, smart contracts, digital certificates, digital signatures, authentication scores, fraud scores, platform rankings, etc.

The processing server 102 can also include a validation module 220. The validation module 220 can be configured to perform validations for the processing server 102 as part of the functions discussed herein. The validation module 220 can receive instructions as input, which can also include data to be used in performing a validation, can perform a validation as requested, and can output a result of the validation to another module or engine of the processing server 102. The validation module 220 can, for example, be configured to validate an NFT by calculating an authentication score and comparing the authentication score to a threshold value, such as discussed in more detail above.

The processing server 102 can also include a transmitting device 222. The transmitting device 222 can be configured to transmit data over one or more networks via one or more network protocols. In some instances, the transmitting device 222 can be configured to transmit data to blockchain nodes 106, digital marketplace 108, creator device 110, purchaser device 112, smart contract platform 114 and other entities via one or more communication methods, local area networks, wireless area networks, cellular communication, Bluetooth, radio frequency, the Internet, etc. In some embodiments, the transmitting device 222 can be comprised of multiple devices, such as different transmitting devices for transmitting data over different networks, such as a first transmitting device for transmitting data over a local area network and a second transmitting device for transmitting data via the Internet. The transmitting device 222 can electronically transmit data signals that have data superimposed that can be parsed by a receiving computing device. In some instances, the transmitting device 222 can include one or more modules for superimposing, encoding, or otherwise formatting data into data signals suitable for transmission.

The transmitting device 222 can be configured to electronically transmit data signals to smart contract platforms 114 that are superimposed or otherwise encoded with response messages, requests for smart contract data, other requests for data, etc. The transmitting device 222 can also be configured to electronically transmit data signals to digital marketplaces 108 and blockchain nodes 106, which can be superimposed or otherwise encoded with requests for smart contract data, requests for NFT data, request for wallet activity, requests for blockchain data, etc.

Process for Authentication of Non-Fungible Tokens (NFTs)

Figure 3:
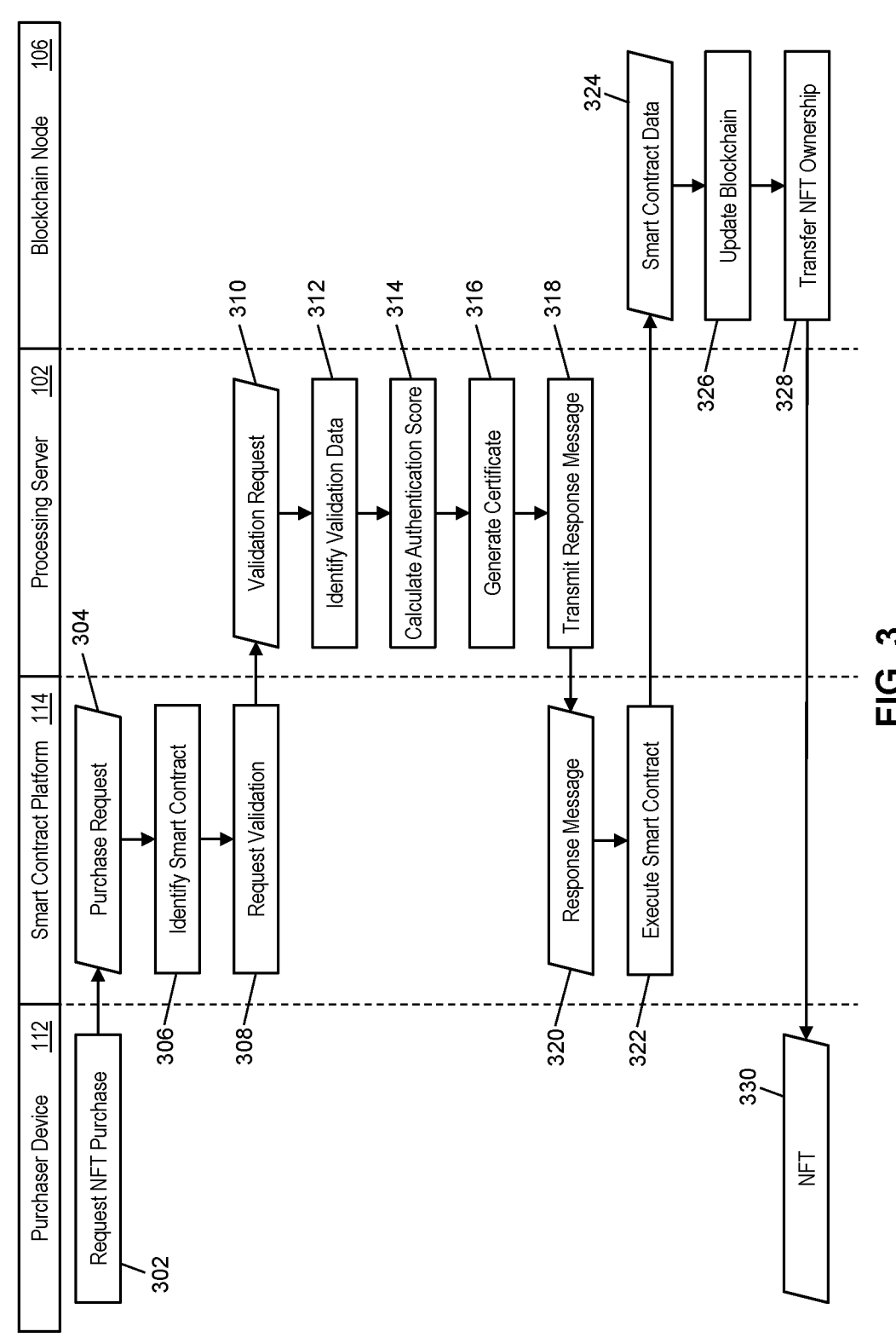
FIG. 3 is a flow diagram illustrating a process for authenticating NFTs performed by the system of FIG. 1 in accordance with exemplary embodiments.

FIG. 3 illustrates a process 300 for the authentication of an NFT using wallet activity and smart contract platform activity in the system 100 of FIG. 1.

In step 302, a purchaser device 112 can request purchase of an NFT that has been created by a creator device 110 and made available via a digital marketplace 108. The NFT or an identifier associated therewith can be stored in a blockchain along with information identifying the creator device 110, such as a digital signature generated using a private key of a blockchain wallet of the creator device 110. The purchaser device 112 can submit a purchase request to the digital marketplace 108 that can forward the request to the smart contract platform 114 using a suitable communication network and method. In step 304, the smart contract platform 114 can receive the purchase request. The purchase request can include the NFT identifier, payment information, and a recipient address generated by a public key of the blockchain wallet of the purchaser device 112.

In step 306, the smart contract platform 114 can identify a smart contract hosted on the platform's blockchain that is associated with the NFT. The smart contract can be identified using the NFT identifier. The smart contract platform 114 can determine that the NFT has not been previously authenticated and, in step 308, can submit a request for validation to the processing server 102 using a suitable communication network and method. In step 310, the receiving device 202 of the processing server 102 can receive the validation request. The validation request can include at least the NFT identifier and, in some cases, can include additional information for use by the processing server 102, such as information identifying the creator device 110, data associated with the NFT, and activity data of the creator device 110 and/or smart contract platform 114.

In step 312, the querying module 216 of the processing server 102 can identify additional data to be used in the validation of the NFT. The additional data can include one or more of: (i) wallet activity of the creator device 110, (ii) wallet activity of the purchaser device 112, (iii) ownership history of the NFT, (iv) activity on the digital marketplace 108, (v) activity on the smart contract platform 114, (vi) fraud score of the smart contract platform 114, (vii) ranking of the smart contract platform 114 among all smart contract platforms, etc. The data can be identified in the validation request, blockchain data from blockchain networks 104, data sources of digital marketplaces 108 and smart contract platforms 114, internal memory 214 of the processing server 102, etc. In step 314, the generation module 218 of the processing server 102 can calculate an authentication score for the NFT using the identified validation data.

In step 316, the validation module 220 of the processing server can determine that the calculated authentication score is above the threshold value, which indicates that the NFT is successfully authenticated. The generation module 218 of the processing server 102 can generate a digital certificate to represent the authenticity of the NFT using a private key of a cryptographic key pair of the processing server 102 (e.g., stored in the memory 214 of the processing server 102). In step 318, the generation module 218 of the processing server 102 can generate a response message that includes an indication of successful authentication and the generated digital certificate, which can be transmitted to the smart contract platform 114 by the transmitting device 222 of the processing server 102 using a suitable communication network and method.

In step 320, the smart contract platform 114 can receive the response message from the processing server 102. In step 322, the smart contract platform 114 can execute the smart contract for the NFT while supplying the digital certificate, payment information, and recipient address as input. Execution of the smart contract can result in initiation of the payment transaction using a suitable method, as well as the transmission of data for a new blockchain transaction on the blockchain that stores the NFT ownership data to a blockchain node 106 in the associated blockchain network 104. In step 324, the blockchain node can receive the smart contract data, which can include the NFT identifier, an identifier for the most recent blockchain data value that transferred ownership of the NFT, the recipient address, the digital certificate, and any other suitable data. In step 326, the blockchain node 106 can update the blockchain, such as by generating a new blockchain data value for transfer of ownership to the purchaser device 112 and including the new blockchain data value in a new block that is generated, confirmed, and, in step 328, added to the blockchain. In step 330, the purchaser device 112 can confirm receipt of the NFT via the new blockchain data value that includes the recipient address generated by the purchaser device 112 and supplied in the purchase request in step 302.

Exemplary Method for Authentication of a Non-Fungible Token (NFT)

FIG. 4 illustrates a method 400 for the authentication of an NFT via the use of a smart contract, wallet activity, and external platform data.

In step 402, a validation request for an NFT can be received by a receiver (e.g., receiving device 202) of a processing server (e.g., processing server 102) from an external platform (e.g., smart contract platform 114), the validation request including at least a smart contract identifier. In step 404, a processor (e.g., generation module 218) of the processing server can calculate an authentication score for the NFT based on at least (i) wallet activity associated with a creator blockchain wallet identified based on the smart contract identifier, and (ii) a fraud score of the external platform.

In step 406, the processor (e.g., validation module 220) of the processing server can determine if the calculated authentication score for the NFT is above a predetermined threshold value. In step 408, a transmitter (e.g., transmitting device 222) of the processing server can transmit a negative response message to the validation request indicating unsuccessful validation of the NFT if the calculated authentication score for the NFT is below the predetermined threshold value, or, if the calculated authentication score for the NFT is above the predetermined threshold value, the transmitter of the processing server can transmit a positive response message to the validation request indicating successful validation of the NFT and instructing the external platform to execute a smart contract associated with the smart contract identifier.

In one embodiment, if the calculated authentication score for the NFT is above the predetermined threshold value, the positive response message can further include a digital certificate generated by the processor of the processing server indicating authenticity of the NFT. In a further embodiment, the digital certificate can be generated via a private key of a cryptographic key pair. In another further embodiment, the digital certificate can be supplied as input to the smart contract prior to execution of the smart contract. In some embodiments, the validation request can further include a public key associated with the blockchain wallet.

In one embodiment, the validation request can include the smart contract. In some embodiments, the authentication score can be further based on at least one of (iii) wallet activity associated with a recipient blockchain wallet identified using data include in the validation request, and (iv) a date associated with creation of the creator blockchain wallet. In one embodiment, the method 400 can further include updating, by the processor (e.g., querying module 216) of the processing server, the fraud score of the external platform based on the determination if the calculated authentication score for the NFT is above the predetermined threshold value.

Computer System Architecture

FIG. 5 illustrates a computer system 500 in which embodiments of the present disclosure, or portions thereof, can be implemented as computer-readable code. For example, the processing server 102, blockchain nodes 106, digital marketplace 108, creator device 110, purchaser device 112, and smart contract platform 114 can be implemented in the computer system 500 using hardware, non-transitory computer readable media having instructions stored thereon, or a combination thereof and can be implemented in one or more computer systems or other processing systems. Hardware can embody modules and components used to implement the methods of FIGS. 3 and 4.

If programmable logic is used, such logic can execute on a commercially available processing platform configured by executable software code to become a specific purpose computer or a special purpose device (e.g., programmable logic array, application-specific integrated circuit, etc.). A person having ordinary skill in the art can appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above-described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 504 is specifically configured to perform the functions discussed herein. The processor device 504 can be connected to a communications infrastructure 506, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 can also include a main memory 508 (e.g., random access memory, read-only memory, etc.), and can also include a secondary memory 510. The secondary memory 510 can include the hard disk drive 512 and a removable storage drive 514, such as a floppy disk drive, a magnetic tape drive, an optical disk drive, a flash memory, etc.

The removable storage drive 514 can read from and/or write to the removable storage unit 518 in a well-known manner. The removable storage unit 518 can include a removable storage media that can be read by and written to by the removable storage drive 514. For example, if the removable storage drive 514 is a floppy disk drive or universal serial bus port, the removable storage unit 518 can be a floppy disk or portable flash drive, respectively. In one embodiment, the removable storage unit 518 can be non-transitory computer readable recording media.

In some embodiments, the secondary memory 510 can include alternative means for allowing computer programs or other instructions to be loaded into the computer system 500, for example, the removable storage unit 522 and an interface 520. Examples of such means can include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc. Suitable configurations and storage types will be apparent to persons having skill in the relevant art.

The computer system 500 can also include a communications interface 524. The communications interface 524 can be configured to allow software and data to be transferred between the computer system 500 and external devices. Exemplary communications interfaces 524 can include a modem, a network interface (e.g., an Ethernet card), a communications port, a PCMCIA slot and card, etc. Software and data transferred via the communications interface 524 can be in the form of signals, which can be electronic, electromagnetic, optical, or other signals as will be apparent to persons having skill in the relevant art. The signals can travel via a communications path 526, which can be configured to carry the signals and can be implemented using wire, cable, fiber optics, a phone line, a cellular phone link, a radio frequency link, etc.

The computer system 500 can further include a display interface 502. The display interface 502 can be configured to allow data to be transferred between the computer system 500 and external display 530. Exemplary display interfaces 502 can include high-definition multimedia interface (HDMI), digital visual interface (DVI), video graphics array (VGA), etc. The display 530 can be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 508 and secondary memory 510, which can be memory semiconductors (e.g., DRAMs, etc.). These computer program products can be means for providing software to the computer system 500. Computer programs (e.g., computer control logic) can be stored in the main memory 508 and/or the secondary memory 510. Computer programs can also be received via the communications interface 524. Such computer programs, when executed, can enable computer system 500 to implement the present methods as discussed herein. In particular, the computer programs, when executed, can enable processor device 504 to implement the methods illustrated by FIGS. 3 and 4, as discussed herein. Accordingly, such computer programs can represent controllers of the computer system 500. Where the present disclosure is implemented using software, the software can be stored in a computer program product and loaded into the computer system 500 using the removable storage drive 514, interface 520, and hard disk drive 512, or communications interface 524.

The processor device 504 can comprise one or more modules or engines configured to perform the functions of the computer system 500. Each of the modules or engines can be implemented using hardware and, in some instances, can also utilize software, such as corresponding to program code and/or programs stored in the main memory 508 or secondary memory 510. In such instances, program code can be compiled by the processor device 504 (e.g., by a compiling module or engine) prior to execution by the hardware of the computer system 500. For example, the program code can be source code written in a programming language that is translated into a lower-level language, such as assembly language or machine code, for execution by the processor device 504 and/or any additional hardware components of the computer system 500. The process of compiling can include the use of lexical analysis, preprocessing, parsing, semantic analysis, syntax-directed translation, code generation, code optimization, and any other techniques that can be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for authentication of non-fungible tokens (NFTs). While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for authentication of non-fungible tokens (NFTs), comprising:

in response to a request to purchase an NFT on a digital marketplace, receiving, by a receiver of a processing server, a validation request for the NFT from a smart contract platform that generates and stores a smart contract associated with the NFT and communicates between the digital marketplace and a blockchain network, wherein the validation request includes at least a smart contract identifier associated with the smart contract;

calculating, by a processor of the processing server, an authentication score for the NFT based on at least (i) wallet activity associated with a creator blockchain wallet on the blockchain network, of a creator of the NFT, identified based on the smart contract identifier, (ii) a fraud score of the smart contract platform that stores the smart contract associated with the NFT, and (iii) a ranking of the smart contract platform among available smart contract platforms, wherein the fraud score and ranking of the smart contract platform are based on whether the smart contract platform has previously participated in transfers of fraudulent NFTs;

determining, by the processor of the processing server, that the calculated authentication score for the NFT is above a predetermined threshold value;

in response to determining that the calculated authentication score is above the predetermined threshold value, generating, by the processor of the processing server, a visual marking indicating a successful authentication;

overlaying, by the processor of the processing server, the visual marking onto the NFT to visually indicate successful authentication; and transmitting, by a transmitter of the processing server, a positive response message to the validation request indicating successful validation of the NFT and instructing the smart contract platform to execute the smart contract associated with the smart contract identifier, wherein the smart contract platform executes the smart contract resulting in a transfer of ownership of the NFT from the creator blockchain wallet to a blockchain wallet of a user purchasing the NFT.

2. The method of claim 1, wherein the positive response message further includes a digital certificate generated by the processor of the processing server indicating authenticity of the NFT.

3. The method of claim 2, wherein the digital certificate is generated via a private key of a cryptographic key pair.

4. The method of claim 2, wherein the digital certificate is supplied as input to the smart contract prior to execution of the smart contract.

5. The method of claim 1, wherein the validation request further includes a public key associated with the creator blockchain wallet.

6. The method of claim 1, wherein the validation request includes the smart contract.

7. The method of claim 1, wherein the authentication score is further based on at least one of (iv) wallet activity associated with a recipient blockchain wallet identified using data included in the validation request, and (v) a date associated with creation of the creator blockchain wallet.

8. The method of claim 1, further comprising:

updating, by the processor of the processing server, the fraud score of the smart contract platform based on the determination that the authentication score for the NFT is above the predetermined threshold value.

9. A system for authentication of non-fungible tokens (NFTs), comprising:

a digital marketplace;

a blockchain network;

a smart contract platform that (i) generates and stores a plurality of smart contracts, each smart contract being associated with a respective NFT and (ii) communicates between the digital marketplace and the blockchain network; and a processing server including a processor and a memory, the memory having instructions stored therein that when executed cause the processor to:

receive, in response to a request to purchase an NFT on the digital marketplace, a validation request for the NFT from the smart contract platform, the validation request including at least a smart contract identifier associated with the smart contract, calculate an authentication score for the NFT based on at least (i) wallet activity associated with a creator blockchain wallet on the blockchain network, of a creator of the NFT, identified based on the smart contract identifier, (ii) a fraud score of the smart contract platform, and (iii) a ranking of the smart contract platform among available smart contract platforms, wherein the fraud score and ranking of the smart contract platform are based on whether the smart contract platform has previously participated in transfers of fraudulent NFTs, determine that the calculated authentication score for the NFT is above a predetermined threshold value, generate, in response to determining that the calculated authentication score is above the predetermined threshold value, a visual marking indicating a successful authentication, overlay the visual marking onto the NFT to visually indicate successful authentication, and transmit a positive response message to the validation request indicating successful validation of the NFT and instructing the smart contract platform to execute the smart contract associated with the smart contract identifier, wherein the smart contract platform executes the smart contract resulting in a transfer of ownership of the NFT from the creator blockchain wallet to a blockchain wallet of a user purchasing the NFT.

10. The system of claim 9, wherein the positive response message further includes a digital certificate generated by the processor of the processing server indicating authenticity of the NFT.

11. The system of claim 10, wherein the digital certificate is generated via a private key of a cryptographic key pair.

12. The system of claim 10, wherein the digital certificate is supplied as input to the smart contract prior to execution of the smart contract.

13. The system of claim 9, wherein the validation request further includes a public key associated with the creator blockchain wallet.

14. The system of claim 9, wherein the validation request includes the smart contract.

15. The system of claim 9, wherein the authentication score is further based on at least one of (iv) wallet activity associated with a recipient blockchain wallet identified using data included in the validation request, and (v) a date associated with creation of the creator blockchain wallet.

16. The system of claim 9, wherein the processor updates the fraud score of the smart contract external platform based on the determination that the calculated authentication score for the NFT is above the predetermined threshold value.

\*  \*  \*  \*  \*